(12) United States Patent
Wei (10) Patent No.: US 11,444,992 B2
(45) Date of Patent: Sep. 13, 2022

(54) METHOD AND APPARATUS FOR COMMUNICATION PROCESSING

(71) Applicant: BEIJING DAJIA INTERNET INFORMATION TECHNOLOGY CO., LTD., Beijing (CN)

(72) Inventor: Chunxiang Wei, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/412,844

(22) Filed: Aug. 26, 2021

(65) Prior Publication Data

US 2022/0038513 A1 Feb. 3, 2022

Related U.S. Application Data

(63) Continuation of application No. PCT/CN2020/132443, filed on Nov. 27, 2020.

(30) Foreign Application Priority Data

Feb. 7, 2020 (CN) .......................... 202010082986.7

(51) Int. Cl.
*H04L 65/4038* (2022.01)
*H04L 12/18* (2006.01)
(Continued)

(52) U.S. Cl.
CPC ...... *H04L 65/4038* (2013.01); *H04L 12/1813* (2013.01); *H04L 51/04* (2013.01);
(Continued)

(58) Field of Classification Search
CPC . H04L 65/4038; H04L 12/1813; H04L 51/04; H04L 65/1069; H04L 65/4069; H04L 69/16

See application file for complete search history.

(56) References Cited

U.S. PATENT DOCUMENTS

| 11,132,172 | B1* | 9/2021 | Naik | ........................ G06F 16/64 |
| 2002/0076003 | A1* | 6/2002 | Zellner | .................. G08B 25/08 379/49 |

(Continued)

FOREIGN PATENT DOCUMENTS

| CN | 106598633 A | 4/2017 |
| CN | 106803969 A | 6/2017 |

(Continued)

OTHER PUBLICATIONS

OA for CN application 202010082986.7.
(Continued)

*Primary Examiner* — Khaled M Kassim
(74) *Attorney, Agent, or Firm* — Timothy W. Menasco, Esq.; Harter Secrest & Emery LLP (57) ABSTRACT

A method and an apparatus for communication processing, a terminal, a server, and a storage medium are provided. The method includes: acquiring a first request, in which the first request is configured to request to turn on a microphone and collect audio; sending a second request to a server, in which the second request is configured to request a configuration document required for microphone-connecting and stream-pushing and the configuration document is configured to provide a setting item required for microphone-connecting and stream-pushing; receiving the configuration document returned from the server; parsing the configuration document, turning on the microphone based on the setting item, collecting the audio and implementing the stream-pushing.

16 Claims, 6 Drawing Sheets

(51) Int. Cl.
*H04L 51/04* (2022.01)
*H04L 65/1069* (2022.01)
*H04L 69/16* (2022.01)
*H04L 65/61* (2022.01)

(52) U.S. Cl.
CPC .......... *H04L 65/1069* (2013.01); *H04L 65/61* (2022.05); *H04L 69/16* (2013.01)

(56) References Cited

U.S. PATENT DOCUMENTS

| | | | | |
|---|---|---|---|---|
| 2003/0138119 | A1* | 7/2003 | Pocino | H04M 3/561 381/119 |
| 2003/0161297 | A1* | 8/2003 | Noda | H04L 65/1009 370/352 |
| 2004/0153549 | A1* | 8/2004 | Naito | H04L 29/06027 709/228 |
| 2006/0056386 | A1* | 3/2006 | Stogel | H04L 65/1069 370/351 |
| 2009/0248413 | A1* | 10/2009 | Liu | G10L 15/30 704/246 |
| 2010/0183128 | A1* | 7/2010 | Logan | H04M 1/6505 379/88.22 |
| 2012/0122524 | A1* | 5/2012 | Kim | H04M 1/72463 455/566 |
| 2014/0163971 | A1* | 6/2014 | Song | H04M 1/21 704/201 |
| 2014/0280470 | A1* | 9/2014 | Calo | H04L 67/142 709/203 |
| 2014/0321664 | A1* | 10/2014 | Huang | H04R 29/005 381/92 |
| 2015/0032691 | A1* | 1/2015 | Hall | G06F 16/183 707/610 |
| 2015/0370323 | A1* | 12/2015 | Cieplinski | G06F 3/013 345/156 |
| 2016/0182600 | A1 | 6/2016 | Swaminathan et al. | |
| 2017/0078452 | A1* | 3/2017 | Verrijt | G06F 9/541 |
| 2017/0163792 | A1* | 6/2017 | Tong | H04W 12/126 |
| 2020/0177405 | A1* | 6/2020 | Sugaya | H04N 7/15 |
| 2020/0341625 | A1* | 10/2020 | Roedel | H04N 7/147 |
| 2021/0219041 | A1* | 7/2021 | Zhang | H04R 1/08 |

FOREIGN PATENT DOCUMENTS

| | | |
|---|---|---|
| CN | 107018446 A | 8/2017 |
| CN | 107295354 A | 10/2017 |
| CN | 107707533 A | 2/2018 |
| CN | 109756504 A | 5/2019 |
| CN | 109756757 A | 5/2019 |
| CN | 109995741 A | 7/2019 |
| CN | 110602519 A | 12/2019 |
| CN | 111385349 A | 7/2020 |
| WO | 2018121015 A1 | 7/2018 |

OTHER PUBLICATIONS

English translation of OA for CN application 202010082986.7.
Notice of Allowance for CN application 202010082986.7.
English translation of Notice of Allowance for CN application 202010082986.7.
ISR for PCT application PCT/CN2020/132443.
English translation of ISR for PCT application PCT/CN2020/132443.

* cited by examiner

METHOD AND APPARATUS FOR COMMUNICATION PROCESSING

This application is a continuation of International Application No. PCT/CN2020/132443 filed on Nov. 27, 2020, which claims the benefit of priority to Chinese Application No. 202010082986.7, filed on Feb. 7, 2020, the contents of which are incorporated herein by reference in their entirety.

TECHNICAL FIELD

The disclosure relates to a field of communication technology, and more particularly to a method and an apparatus for communication processing, a terminal, a server, and a storage medium.

BACKGROUND

Recently, the multiplayer chat room based on live streaming is getting into users' good graces more and more. A chat room may allow multiple persons to chat online, it is easy and convenient and has various playing methods, such that social contact and entrainment requirements of different groups can be met and the market penetration rate is improved continuously.

In related art, the chat room mostly adopts a long connection signaling for communication. However, due to limitation of a carrying capacity of a long connection server, the server generally may set a transmission interval of the long connection signaling to several seconds, which greatly affects the instantaneity of arrival of the signaling. Due to time delay or loss of the signaling, it may take a long time to connect the microphone depending on the signaling and a success rate of connecting the microphone is low, thereby leading to a bad user experience.

SUMMARY

The disclosure provides a method and an apparatus for communication processing, a terminal, a server and a non-transitory storage medium, to at least solve a problem that it takes a long time to connect the microphone in the related art. The technical solutions will be described as follows.

According to a first aspect of the disclosure, a method for communication processing is provided. The method is applicable to a client and includes: acquiring a first request, in which the first request is configured to request to turn on a microphone and collect audio, sending a second request to a server, in which the second request is configured to request a configuration document required for microphone-connecting and stream-pushing and the configuration document is configured to provide a setting item required for microphone-connecting and stream-pushing; receiving the configuration document returned from the server; parsing the configuration document, turning on the microphone based on the setting item, collecting the audio and implementing the stream-pushing.

According to a second aspect of the disclosure, a method for communication processing is provided. The method is applicable in a server and includes receiving a first request sent by a client, in which the first request is configured to request a configuration document required for microphone-connecting and stream-pushing; acquiring the configuration document based on the first request, in which the configuration document is configured to provide a setting item required by the client for microphone-connecting and stream-pushing; and sending the configuration document to the client as a response to the first request.

According to a third aspect of the disclosure, an apparatus for communication processing is provided. The apparatus is applicable to a client and includes a processor and a memory configured to store instructions executable by the processor. The processor is configured to execute the instructions to perform the following operations: acquiring a first request, in which the first request is configured to request to turn on a microphone and collect audio, sending a second request to a server, in which the second request is configured to request a configuration document required for microphone-connecting and stream-pushing and the configuration document is configured to provide a setting item required for microphone-connecting and stream-pushing; receiving the configuration document returned from the server; parsing the configuration document, turning on the microphone based on the setting item, collecting the audio and implementing the stream-pushing.

According to a fourth aspect of the disclosure, an apparatus for communication processing is provided. The apparatus is applicable to a server and includes a processor and a memory configured to store instructions executable by the processor. The processor is configured to execute the instructions to perform the following operations: receiving a first request sent by a client, in which the first request is configured to request a configuration document required for microphone-connecting and stream-pushing; acquiring the configuration document based on the first request, in which the configuration document is configured to provide a setting item required by the client for microphone-connecting and stream-pushing; and sending the configuration document to the client as a response to the first request.

According to a fifth aspect of the disclosure, a terminal is provided. The terminal includes a processor and a memory configured to store instructions executable by the processor. The processor is configured to execute the instructions to perform the method for communication processing according to the first aspect.

According to a sixth aspect of the disclosure, a server is provided. The server includes a processor and a memory configured to store instructions executable by the processor. The processor is configured to execute the instructions to perform the method for communication processing according to the second aspect.

According to a seventh aspect of the present disclosure, a non-transitory storage medium is provided. When instructions in the storage medium are executed by a processor of a terminal, the terminal is caused to perform the method for communication processing according to the first aspect. Or, when instructions in the storage medium are executed by a processor of a server, the server is caused to perform the method for communication processing according to the second aspect.

According to an eighth aspect of the present disclosure, a computer program product is provided. The computer program product includes readable program codes. When the readable program codes are executed by a processor of a terminal, the terminal is caused to perform the method for communication processing according to the first aspect. Or, when the readable program codes are executed by a processor of a server, the server is caused to perform the method for communication processing according to the second aspect.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the disclosure. The accompanying drawings together with the specification explain the principle of the disclosure, but shall not be construed to limit the disclosure.

DETAILED DESCRIPTION

The solutions of the embodiments of the disclosure are clearly and completely described below with reference to the accompanying drawings in the embodiments of the disclosure.

It is to be understood those terms such as "first" and "second" in the specification, and claims and accompanying drawings may be used solely to distinguish similar objects without necessarily requiring or implying a specific order or sequence. It should be understood that such data may be exchangeable in an appropriate situation, so that embodiments described herein may be executed in an order other than that described in the accompanying or in the specification. The implementations described in the following embodiments shall not be construed to represent all implementations of the present disclosure. Rather, they are merely some examples of the apparatus and method according to some aspects of the present disclosure, as described in the claims.

After a user enters into a chat room and requests for microphone connecting, it may take a long time to connect the microphone due to a large time delay of signaling, or even the user may fail to connect the microphone because the signaling is lost due to network jitter. In order to solve the problem, the disclosure provides the following technical solution.

Figure 1:
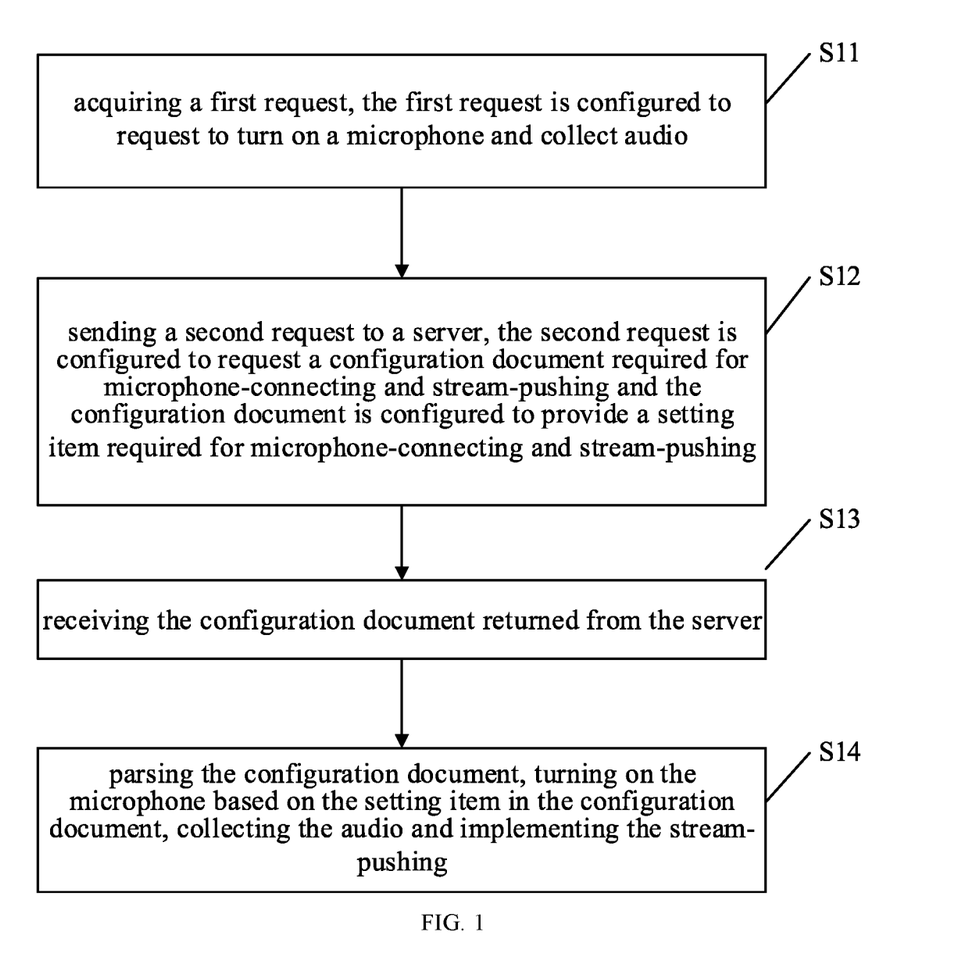
FIG. 1 is a flowchart illustrating a method for communication processing according to an example embodiment.

FIG. 1 is a flowchart illustrating a method for communication processing according to an example embodiment. As illustrated in FIG. 1, the method for communication processing is applicable in a client and may include the following.

At block S11, a first request is acquired. The first request is configured to request to turn on a microphone and collect audio. In the embodiment, the first request may be a request for microphone-connecting operation.

After an anchor user creates a chat room based on live streaming, an audience user may enter into the chat room. If the audience user wants to make a speech, the audience user may request a connection to the microphone, so as to request to turn on the microphone and collect the audio. The client may acquire the request for microphone-connecting operation based on an operation of the user.

At block S12, a second request is sent to a server. The second request is configured to request a configuration document required for microphone-connecting and stream-pushing. The configuration document is configured to provide a setting item required for microphone-connecting and stream-pushing. In the embodiment, the second request may be an HTTP request for microphone-connecting.

After the client acquires the request for microphone-connecting operation, the microphone-connecting HTTP (Hypertext Transfer Protocol) request is sent to the server, so as to request the configuration document required for microphone-connecting and stream-pushing from the server through the HTTP request for microphone-connecting.

When sending the HTTP request for microphone-connecting to the server, a TCP (Transmission Control Protocol) connection between the client and the server needs to be established by using the three-way handshake protocol. A process of establishing the TCP connection using the three-way handshake protocol may include the following. The client sends a message SYN (SEQ=x) to the server and enters into a SYN_SEND state. The server receives the message SYN, returns a message SYN (SEQ=y) ACK (ACK=x+1) and enters into a SYN_RECV state. The client receives the message from the server, returns a message ACK (ACK=y+1) and enters into an established state. After the TCP connection is established, the client may send the HTTP request for microphone-connecting to the server through the TCP connection.

At block S13, the configuration document returned by the server is received.

After receiving the HTTP request for microphone-connecting, the server may acquire the configuration document corresponding to the HTTP request for microphone-connecting, and return the configuration document to the client as a response to the HTTP request for microphone-connecting. The client receives the configuration document returned by the server, and may perform a microphone-connecting operation based on the configuration document. After receiving the configuration document returned by the server, the client may turn off the TCP connection with the server and release resources in time.

At block S14, the configuration document is parsed, the microphone is turned on based on the setting item in the configuration document, the audio is collected and the stream-pushing is implemented.

Alternatively, the setting item in the configuration document may include: an IP address for the stream-pushing, an audio sample rate, a code format, and a code rate etc. The IP address for the stream-pushing may be a chat room identification. The audio sample rate refers to a sample rate used to collect the audio. The code format refers to a code format used for encoding the collected audio. The code rate refers to a code rate used for the stream-pushing.

After the client receives the configuration document returned by the server, the client parses the configuration document to acquire each setting item in the configuration document, turns on the microphone based on each setting item in the configuration document, collects the audio based on the audio sample rate in the configuration document, encodes the audio based on the code format in the configuration document, and implements the stream-pushing based on the code rate in the configuration document when implement the stream-pushing after encoding.

According to the method for communication processing of the disclosure, by acquiring the request for microphone-connecting operation, sending the HTTP request for microphone-connecting, receiving the configuration document returned from the server as the response to the HTTP request for microphone-connecting and parsing the configuration document, the microphone-connecting operation can be implemented.

The method for communication processing of the disclosure may solve the problem of the time delay and loss of signaling when performing a microphone-connecting communication using a long connection signaling, the time used to connect the microphone may be reduced, and a success rate of connecting to the microphone may be improved.

In some embodiments, the method for communication processing may further include sending a third request to the server after a success of the stream-pushing. The third request is configured to inform the server of the success of the stream-pushing. In the embodiment, the third request may be an HTTP request for microphone-connecting success. Alternatively, if the server does not receive any stream-pushing data within a time period, it indicates that the reception of the stream-pushing data is completed at the server side, such that indication information may be sent to the client. After receiving the indication information, the client may send the HTTP request for microphone-connecting success to the server. Alternatively, if the client does not acquire data to be pushed within a time period, the client may directly send the HTTP request for microphone-connecting success to the server.

After determining the success of the stream-pushing, the client may establish the TCP connection with the server again, and send the HTTP request for microphone-connecting success to the server through the TCP connection to inform the success of the microphone-connecting, such that the server may alter an interaction state of the client.

The microphone-connecting operation may be executed by a microphone-connecting SDK (Software Development Kit) in the client. The microphone-connecting SDK is a part of the client and a software package for perform the microphone-connecting operation, which is separately encapsulated to implement underlying functions and independent of the business level. After receiving the configuration document returned by the server, the client may send the configuration document to the microphone-connecting SDK. After receiving the configuration document, the microphone-connecting SDK parses the configuration document to obtain each setting item in the configuration document, turns on the microphone based on each setting item in the configuration document, collects the audio based on the audio sample rate in the configuration document, encodes the audio based on the code format in the configuration document, implements the stream-pushing based on the code rate in the configuration document when implement the stream-pushing after encoding, and returns steam-pushing success information to the client after determining that the steam-pushing succeeds. After acquiring the steam-pushing success information returned by the microphone-connecting SDK, the client establishes the TCP connection with the server again, and sends the HTTP request for microphone-connecting success to the server through the TCP connection to inform the server of the success of the microphone-connecting, such that the server may alter an interaction state of the client.

Figure 2:
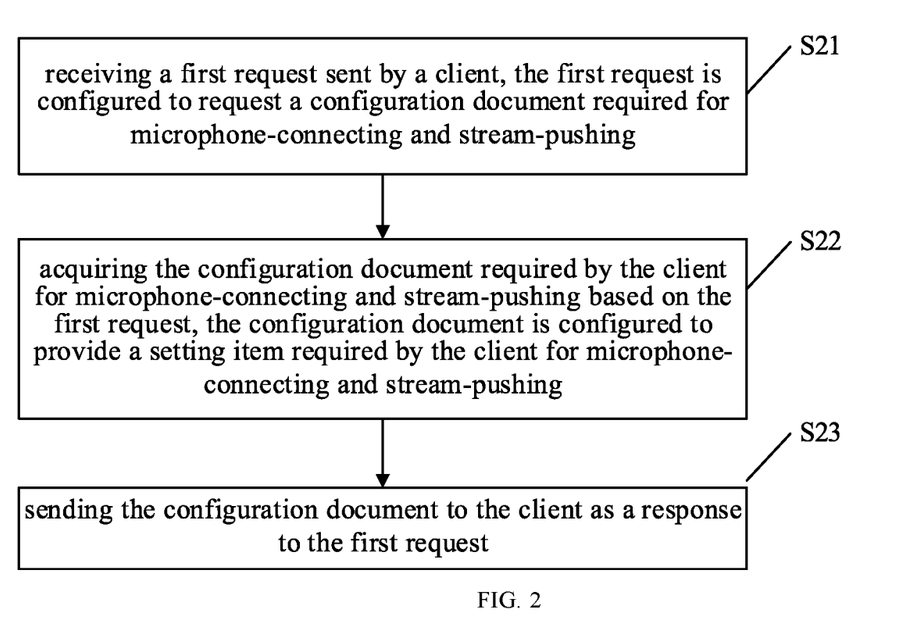
FIG. 2 is a flowchart illustrating a method for communication processing according to an example embodiment.

FIG. 2 is a flowchart illustrating a method for communication processing according to an example embodiment. As illustrated in FIG. 2, the method for communication processing is applicable in a server.

At block S21, a first request sent by a client is received. The first request is configured to request a configuration document required for microphone-connecting and stream-pushing. In the embodiment, the first request may be an HTTP request for microphone-connecting.

The HTTP request for microphone-connecting is a request initiated by an audience user in a chat room. In other words, after an anchor user creates a chat room based on live streaming, an audience user may enter into the chat room. If the audience user wants to make a speech, the audience user may send the HTTP request for microphone-connecting through the client.

Before receiving the HTTP request for microphone-connecting, a TCP connection is established with the client using the three-way handshake protocol. A process of establishing the TCP connection has been described above, which is not elaborated here. After establishing the TCP connection with the client, data may be transmitted through the TCP connection, i.e., the HTTP request for microphone-connecting sent by the client may be received through the TCP connection.

At block S22, the configuration document required by the client for microphone-connecting and stream-pushing is acquired based on the HTTP request for microphone-connecting. The configuration document is configured to provide a setting item required by the client for microphone-connecting and stream-pushing.

The configuration document may include: an IP address for the stream-pushing, an audio sample rate, a code format, and a code rate etc. The IP address for the stream-pushing may be a chat room identification. The audio sample rate refers to a sample rate used to collect the audio. The code format refers to a code format used for encoding the collected audio. The code rate refers to a code rate used for the stream-pushing.

After receiving the HTTP request for microphone-connecting sent by the client, the configuration document required by the client for microphone-connecting and stream-pushing may be acquired based on the chat room identification in the HTTP request for microphone-connecting. All clients in one chat room may use the same configuration document, i.e., using the same audio sample rate, the same code format, and the same code rate. Also, the same IP address for the stream-pushing is used, i.e., the chat room identification.

At block S23, the configuration document is sent to the client as a response to the HTTP request for microphone-connecting.

After acquiring the configuration document required by the client for microphone-connecting and stream-pushing, the configuration document, which is configured as the response to the HTTP request for microphone-connecting, is sent to the client through the TCP connection. Subsequently, the client may perform a microphone-connection operation based on the configuration document.

According to the method for communication processing of the disclosure, by receiving the HTTP request for microphone-connecting sent by the client, acquiring the configuration document required by the client for microphone-connecting and stream-pushing based on the HTTP request for microphone-connecting, sending the configuration document to the client as the response to the HTTP request for microphone-connecting, the problem of the time delay and loss of signaling when performing microphone-connecting communication using a long connection signaling may be solved, the time used to connect the microphone may be reduced, and a success rate of connecting to the microphone may be improved.

In some embodiments, acquiring the configuration document required by the client for microphone-connecting and stream-pushing based on the HTTP request for microphone-connecting may include sending a second request to a streaming media data center, in which the second request is configured to request the configuration document required by the client for microphone-connecting and stream-pushing from the streaming media data center; and receiving the configuration document returned by the streaming media data center. The streaming media data center is configured to provide services related to streaming media data. In the embodiment, the second request may be a request for acquiring a configuration document.

After receiving the HTTP request for microphone-connecting sent by the client, the server sends the configuration document acquiring request to the streaming media data center. The streaming media data center allocates resources required for microphone-connecting and stream-pushing to the client based on the chat room identification in the configuration document acquiring request, generates the configuration document required by the client for microphone-connecting and stream-pushing and returns the configuration document to the server. The server receives the configuration document returned by the streaming media data center. By interaction between the server and the streaming media data center, the configuration document required by the client for microphone-connecting and stream-pushing may be acquired. The services provided by the server and the services provided by the streaming media data center are independent relatively, do not influence each other, and may work well.

In some embodiments, the streaming media data center generates the configuration document required by the client for microphone-connecting and stream-pushing based on a current system load. After receiving the configuration document acquiring request sent by the server, the streaming media data center allocates resources required for microphone-connecting and stream-pushing to the client and generates the configuration document required by the client for microphone-connecting and stream-pushing based on the current system load. For example, in a case that the current system load is small, a high code rate may be set for ensure a high transmission speed, while in a case that the current system load is large, a low code rate may be set for ensure running of each client.

Figure 3:
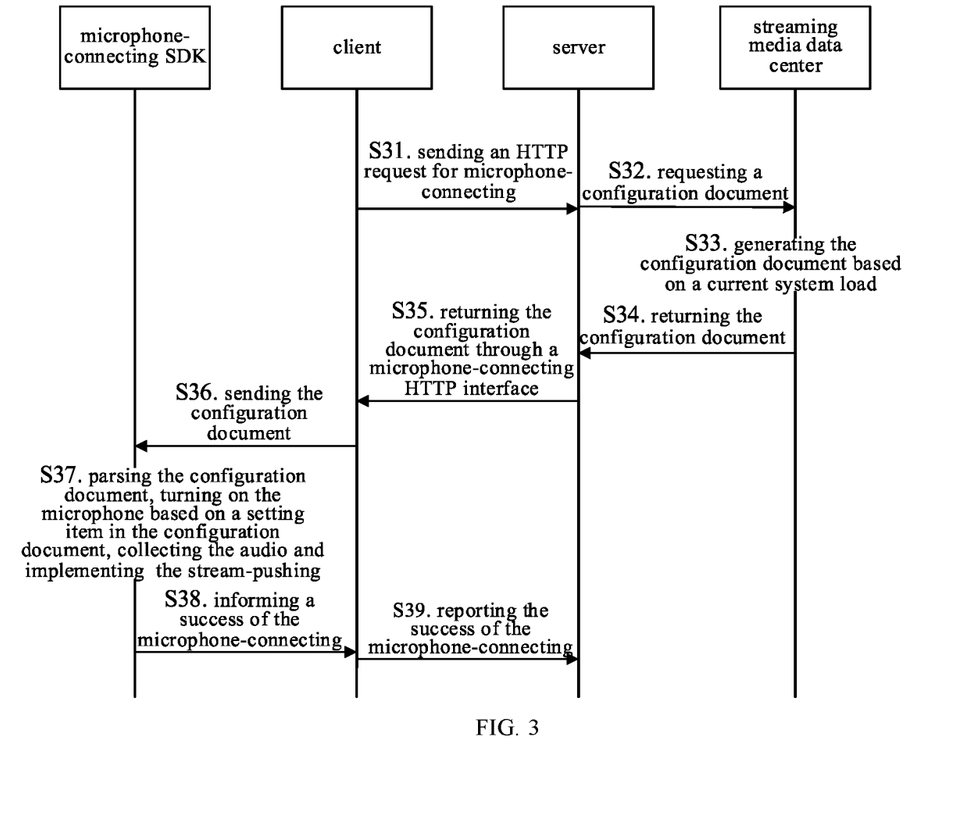
FIG. 3 is a schematic diagram illustrating an interaction in a method for communication processing according to an example embodiment.

FIG. 3 is a schematic diagram illustrating an interaction in a method for communication processing according to an example embodiment. As illustrated in FIG. 3, the method for communication processing may include the following.

At block S31, a client acquires a request for microphone-connecting operation and sends an HTTP request for microphone-connecting to a server. The HTTP request for microphone-connecting is configured to request a configuration document required for microphone-connecting and stream-pushing. The configuration document is configured to provide a setting item required for microphone-connecting and stream-pushing.

After an anchor user creates a chat room based on live streaming, an audience user may enter into the chat room. If the audience user wants to make a speech, the audience user may request a connection to the microphone. The client may acquire the request for microphone-connecting operation based on an operation of the user and send the HTTP request for microphone-connecting to the server.

At block S32, the server sends a configuration document acquiring request to a streaming media data center based on the HTTP request for microphone-connecting.

At block S33, the streaming media data center generates the configuration document required by the client for microphone-connecting and stream-pushing based on a current system load.

At block S34, the streaming media data center returns the configuration document to the server.

At block S35, the server returns the configuration document to the client through a microphone-connecting HTTP interface.

At block S36, the client sends the configuration document to a microphone-connecting SDK.

At block S37, the microphone-connecting SDK parses the configuration document, turns on the microphone based on a setting item in the configuration document, collects the audio and implements the stream-pushing.

After collecting the audio, the microphone-connecting SDK may push the corresponding stream to the streaming media data center, so that other clients in the chat room may pull the stream from the streaming media data center.

At block S38, after a success of the stream-pushing, the microphone-connecting SDK returns microphone-connecting success information to the client.

At block S39, the client sends an HTTP request for microphone-connecting success to the server.

After the success of the microphone-connecting, the client sends an HTTP request again to inform the server of the success of the microphone-connecting. Based on the HTTP request, if a response to the HTTP request from the server is received, it indicates that the server receives the notification of the success of the microphone-connecting.

According to the method for communication processing of the disclosure, by performing communication based on HTTP requests when a microphone-connecting communication is performed between the server and the client, the problem of the time delay and loss of signaling when performing the microphone-connecting communication using a long connection signaling may be solved, the time used by the audience to connect the microphone may be reduced greatly, and a success rate of connecting to the microphone may be improved, thereby improving the user experience.

Figure 4:
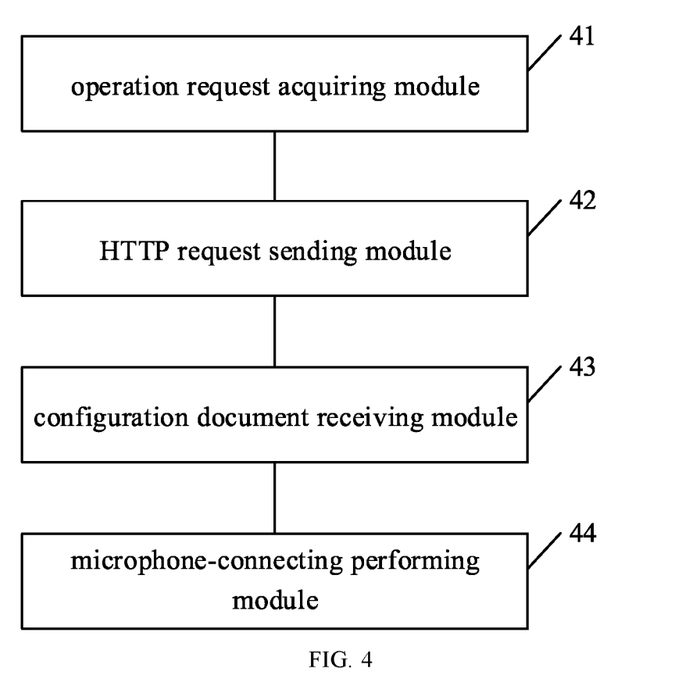
FIG. 4 is a block diagram illustrating an apparatus for communication processing according to an example embodiment.

FIG. 4 is a block diagram illustrating an apparatus for communication processing according to an example embodiment. The apparatus is applicable in a client. As illustrated in FIG. 4, the apparatus includes an operation request acquiring module 41, an HTTP request sending module 42, a configuration document receiving module 43 and a microphone-connecting performing module 44.

The operation request acquiring module 41 is configured to acquire a request for microphone-connecting operation, in which the request for microphone-connecting operation is configured to request to turn on a microphone and collect audio.

The HTTP request sending module 42 is configured to send an HTTP request for microphone-connecting to a server, in which the HTTP request for microphone-connecting is configured to request a configuration document required for microphone-connecting and stream-pushing and the configuration document is configured to provide a setting item required for microphone-connecting and stream-pushing.

The configuration document receiving module 43 is configured to receive the configuration document returned from the server.

The microphone-connecting performing module 44 is configured to parse the configuration document, turn on the microphone based on the setting item in the configuration document, collect the audio and implement the stream-pushing.

Alternatively, the apparatus may further include a microphone-connecting success informing module configured to send an HTTP request for microphone-connecting success to the server based on a success of the stream-pushing. The HTTP request for microphone-connecting success is configured to inform the server of the success of the microphone-connecting.

The HTTP request sending module is further configured to establish a TCP connection with the server, send the HTTP request for microphone-connecting to the server through the TCP connection, and turn off the TCP connection after the configuration document is received.

The microphone-connecting success informing module is configured to re-establish the TCP connection with the server, and send the HTTP request for microphone-connecting success to the server through the re-established TCP connection.

According to the apparatus for communication processing of the disclosure, the operation request acquiring module acquires the request for microphone-connecting operation, the HTTP request sending module sends the HTTP request for microphone-connecting to the server, the configuration document receiving module receives the configuration document returned from the server as the response to the HTTP request and the microphone connecting performing module parses the configuration document and perform the microphone-connecting operation. The problem of the time delay and loss of signaling when performing a microphone-connecting communication using a long connection signaling may be solved, the time used to connect the microphone may be reduced, and a success rate of connecting to the microphone may be improved.

Figure 5:
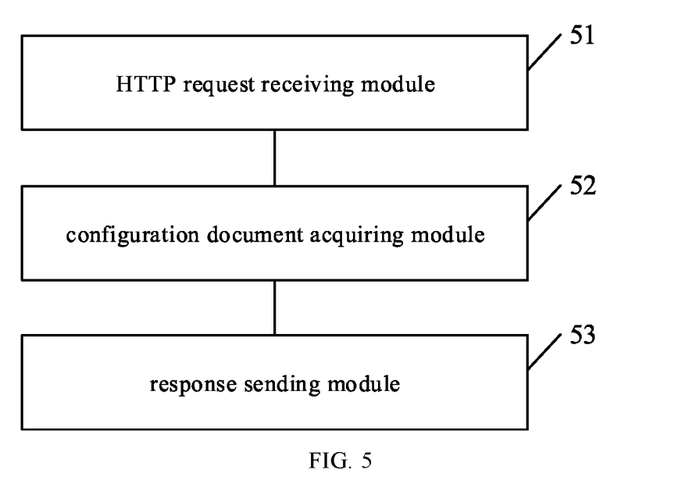
FIG. 5 is a block diagram illustrating an apparatus for communication processing according to an example embodiment.

FIG. 5 is a block diagram illustrating an apparatus for communication processing according to an example embodiment. The apparatus is applicable in a server. As illustrated in FIG. 5, the apparatus includes an HTTP request receiving module 51, a configuration document acquiring module 52 and a response sending module 53.

The HTTP request receiving module 51 is configured to receive an HTTP request for microphone-connecting sent by a client. The HTTP request for microphone-connecting is configured to request a configuration document required for microphone-connecting and stream-pushing.

The configuration document acquiring module 52 is configured to acquire the configuration document required by the client for microphone-connecting and stream-pushing based on the HTTP request for microphone-connecting. The configuration document is configured to provide a setting item required by the client for microphone-connecting and stream-pushing.

The response sending module 53 is configured to send the configuration document to the client as a response to the HTTP request for microphone-connecting.

Alternatively, the configuration document acquiring module includes a configuration document requesting unit, and a configuration document receiving unit.

The configuration document requesting unit is configured to send a configuration document acquiring request to a streaming media data center based on the HTTP request for microphone-connecting. The configuration document acquiring request is configured to request the configuration document required by the client for microphone-connecting and stream-pushing from the streaming media data center.

The configuration document receiving unit is configured to receive the configuration document returned by the streaming media data center.

Alternatively, the streaming media data center generates the configuration document required by the client for microphone-connecting and stream-pushing based on a current system load.

Alternatively, the configuration document includes an IP address for the stream-pushing, an audio sample rate, a code format and a code rate.

According to the apparatus for communication processing of the disclosure, the HTTP request receiving module receives the HTTP request for microphone-connecting sent by the client, the configuration document acquiring module acquires the configuration document required by the client for microphone-connecting and stream-pushing based on the HTTP request for microphone-connecting, the response sending module sends the configuration document to the client as the response to the HTTP request for microphone-connecting. The problem of the time delay and loss of signaling when performing a microphone-connecting communication using a long connection signaling may be solved, the time used to connect the microphone may be reduced, and a success rate of connecting to the microphone may be improved.

Figure 6:
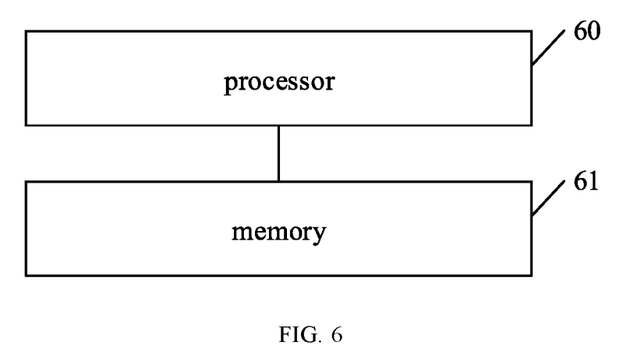
FIG. 6 is a block diagram illustrating a terminal according to an example embodiment.

FIG. 6 is a block diagram illustrating an apparatus for communication processing according to an example embodiment. The apparatus is applicable in a client. As illustrated in FIG. 6, the apparatus includes a processor 60 and a memory 61. The memory 61 is configured to store instructions executable by the processor 60.

The processor 60 is configured to execute the instructions to perform the following operations: acquiring a request for microphone-connecting operation, in which the request for microphone-connecting operation is configured to request to turn on a microphone and collect audio, sending an HTTP request for microphone-connecting to a server, in which the HTTP request for microphone-connecting is configured to request a configuration document required for microphone-connecting and stream-pushing and the configuration document is configured to provide a setting item required for microphone-connecting and stream-pushing; receiving the configuration document returned from the server; parsing the configuration document, turning on the microphone based on the setting item in the configuration document, collecting the audio and implementing the stream-pushing.

Alternatively, the processor 60 is further configured to perform an operation of sending an HTTP request for microphone-connecting success to the server based on a success of the stream-pushing. The HTTP request for microphone-connecting success is configured to inform the server of the success of the microphone-connecting.

Alternatively, the processor 60 is further configured to perform the following operations: establishing a TCP connection with the server, sending the HTTP request for microphone-connecting to the server through the TCP connection, and turning off the TCP connection after the configuration document is received.

Alternatively, the processor 60 is further configured to perform the following operations: re-establishing the TCP connection with the server, and sending the HTTP request for microphone-connecting success to the server through the re-established TCP connection.

Alternatively, the configuration document includes an IP address for the stream-pushing, an audio sample rate, a code format and a code rate.

According to the apparatus for communication processing of the disclosure, by acquiring the request for microphone-connecting operation, sending the HTTP request for microphone-connecting, receiving the configuration document returned from the server as the response to the HTTP request for microphone-connecting and parsing the configuration document, the microphone-connecting operation can be implemented. The problem of the time delay and loss of signaling when performing a microphone-connecting communication using a long connection signaling may be solved, the time used to connect the microphone may be reduced, and a success rate of connecting to the microphone may be improved.

Figure 7:
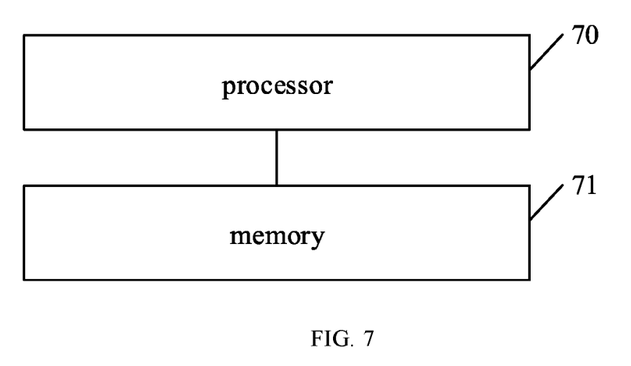
FIG. 7 is a block diagram illustrating a server according to an example embodiment.

FIG. 7 is a block diagram illustrating an apparatus for communication processing according to an example embodiment. The apparatus is applicable in a server. As illustrated in FIG. 7, the apparatus includes a processor 70 and a memory 71. The memory 71 is configured to store instructions executable by the processor 70.

The processor 70 is configured to execute the instructions to perform the following operations: receiving an HTTP request for microphone-connecting sent by a client, in which the HTTP request for microphone-connecting is configured to request a configuration document required for microphone-connecting and stream-pushing; acquiring the configuration document required by the client for microphone-connecting and stream-pushing based on the HTTP request for microphone-connecting, in which the configuration document is configured to provide a setting item required by the client for microphone-connecting and stream-pushing; and sending the configuration document to the client as a response to the HTTP request for microphone-connecting.

Alternatively, the processor 70 is further configured to perform the following operations: sending a configuration document acquiring request to a streaming media data center based on the HTTP request for microphone-connecting and receiving the configuration document returned by the streaming media data center. The configuration document acquiring request is configured to request the configuration document required by the client for microphone-connecting and stream-pushing from the streaming media data center.

Alternatively, the streaming media data center generates the configuration document based on a current system load.

Alternatively, the configuration document includes an IP address for the stream-pushing, an audio sample rate, a code format and a code rate.

According to the apparatus for communication processing of the disclosure, by receiving the HTTP request for microphone-connecting sent by the client, acquiring the configuration document required by the client for microphone-connecting and stream-pushing based on the HTTP request for microphone-connecting, sending the configuration document to the client as the response to the HTTP request for microphone-connecting.

With respect to the apparatus according to the embodiment described above, the ways to perform operations by respective modules have been described in the associated method embodiments, which are not described here.

Figure 8:
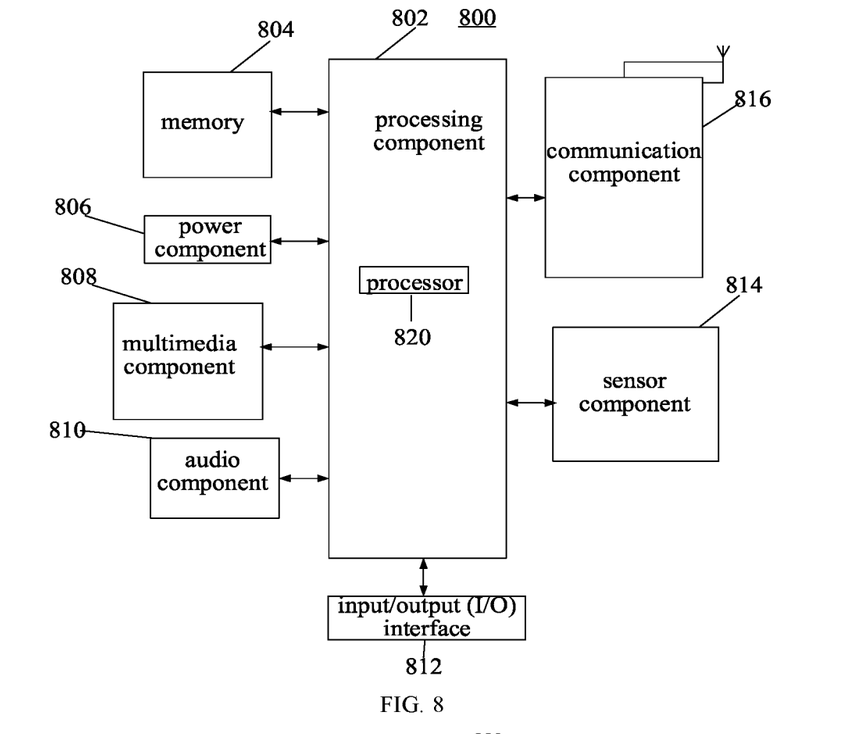
FIG. 8 is a block diagram illustrating a terminal according to an example embodiment.

FIG. 8 is a block diagram of a terminal 800 according to an example embodiment. For example, the terminal 800 may be a mobile phone, a computer, a digital broadcasting terminal, a messaging device, a game console, a tablet device, a medical device, a fitness device, a personal digital assistant, etc.

As illustrated in FIG. 8, the terminal 800 may include one or more components: a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations in the terminal 800. Examples of these data include instructions for any application or method operating on the terminal 800, contact data, phone book data, messages, pictures, videos, and so on. The memory 804 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 806 provides power to various components of the terminal 800. The power component 806 may include a power management system, one or more power supplies, and other components associated with generating, managing, and distributing power for the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera and/or the rear camera can receive external multimedia data. Each front camera and rear camera can be a fixed optical lens system or an optical lens system having focal length and optical zoom capabilities.

The audio component 810 is configured to output and/or input audio signals. For example, the audio component 810 includes a microphone (MIC). When the terminal 800 is in an operating mode, such as a call mode, a recording mode, and a voice recognition mode, the microphone is configured to receive external audio signals. The received audio signals may be further stored in the memory 804 or transmitted via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to: home button, volume button, start button, and lock button.

The sensor component 814 includes one or more sensors for providing the terminal 800 with various aspects of state assessment. For example, the sensor component 814 can detect the open/close state of the terminal 800 and the relative positioning of components, such as the display and keypad of the terminal 800. The sensor component 814 can also detect the position change of the terminal 800 or a component of the terminal 800, presence or absence of contact of the user to the terminal 800, the orientation or acceleration/deceleration of the terminal 800, and the temperature change of the terminal 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal 800 and other devices. The terminal 800 can access a wireless network based on a communication standard, such as Wi-Fi, 2G, or 3G, or a combination thereof. In an exemplary embodiment, the communication component 816 receives a broadcast signal or broadcast related information from an external broadcast management system via a broadcast channel. In an exemplary embodiment, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 800 may be implemented by one or more application specific integrated circuits (ASICs), digital signal processors (DSP), digital signal processing devices (DSPD), programmable logic devices (PLD), field programmable gate array (FPGA), controller, microcontroller, microprocessor, or other electronic components, used to perform the above methods.

Another exemplary embodiment of the present disclosure provides a non-transitory computer-readable storage medium, such as memory 804 including instructions, which can be executed by the processor 820 of the terminal 800 to complete the foregoing method. For example, the computer-readable storage medium may be ROM, random access memory (RAM), CD-ROM, magnetic tape, floppy disk, optical data storage device, etc.

Figure 9:
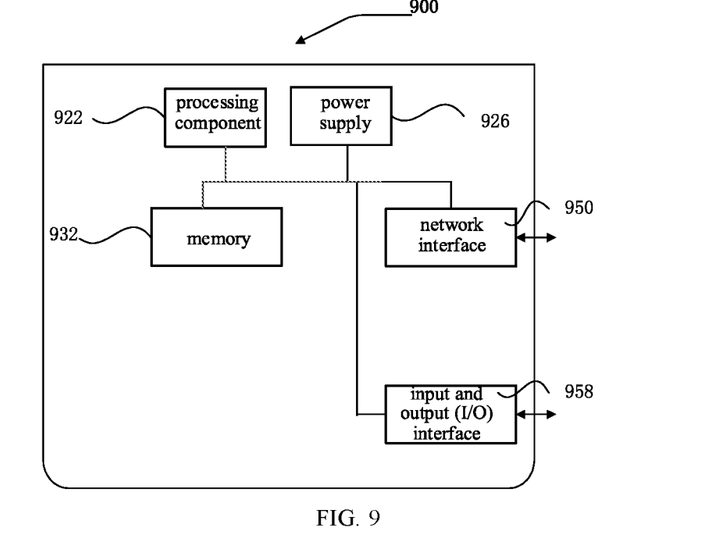
FIG. 9 is a block diagram illustrating a server according to an example embodiment.

FIG. 9 is a block diagram of a server 900 according to an example embodiment of the disclosure. Referring to FIG. 9, the server 900 may include a processing component 922 including one or more processors, and a memory resource represented by a memory 932 for storing instructions (such as application programs) executable by the processing component 922. The application programs stored in the memory 932 may include one or more modules, and each module may correspond to a series of instructions. Furthermore, the processing component 922 may be configured to execute the instructions so as to perform the above-mentioned method for recommending a live streaming room.

The server 900 may further include a power supply 926 configured to perform a power management of the server 900, a wired or wireless network interface 950 configured to connect the server 900 to the internet, and an input and output (I/O) interface 958. The server 900 may operate an operating system stored in the memory 932, such as Windows Server™, Mac OS X™, Unix™, Linux™, FreeBSD™ and so on.

In example embodiments, there is also provided a non-transitory storage medium including instructions, such as the memory 932 including the instructions. The instructions may be executed by the processing component 922 in the server 900, for performing the above-described method for communication processing. Alternatively, the storage medium may be a non-transitory computer-readable storage medium, for example, the non-transitory computer-readable storage medium may be a ROM, a RAM, a CD-ROM, a magnetic tape, a floppy disc, an optical data storage device, and the like.

In some embodiments, a computer program product is provided. The computer program product includes readable program codes. The readable program codes in the computer program product are executed by the processing component 922 in the server 900, for performing the above-described method for communication processing. Alternatively, the program codes may be stored in the storage medium of the server 900. The storage medium may be a non-transitory computer-readable storage medium, for example, the non-transitory computer-readable storage medium may be a ROM, a RAM, a CD-ROM, a magnetic tape, a floppy disc, an optical data storage device, and the like.

Those skilled in the art may easily conceive of other embodiments of the disclosure by considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

The invention claimed is:

1. A method for communication processing, applicable in a client, comprising:
   acquiring a first request, wherein the first request is configured to request to turn on a microphone and collect audio;
   establishing a transmission control protocol (TCP) connection with a server;
   sending a second request to the server, wherein the second request is configured to request a configuration document required for microphone-connecting and stream-pushing, and the configuration document is configured to provide a setting item required for microphone-connecting and stream-pushing;
   receiving the configuration document returned from the server;
   turning off the TCP connection with the server;
   parsing the configuration document;

turning on the microphone based on the setting item; and
collecting the audio and implementing the stream-pushing, wherein the second request is an HTTP request, and the configuration document is returned by the server as a response to the HTTP request.

2. The method of claim 1, further comprising:
sending a third request to the server based on a success of the stream-pushing, wherein the third request is configured to inform the server of a success of the microphone-connecting.

3. The method of claim 1, further comprising:
re-establishing the TCP connection with the server, and sending the third request to the server through the re-established TCP connection.

4. The method of claim 1, wherein the configuration document comprises an IP address for the stream-pushing, an audio sample rate, a code format and a code rate.

5. The method of claim 2, said sending a third request to the server comprising:
sending the third request to the server in response to indication information sent by the server, wherein the indication information is configured to indicate that the server does not receive any stream-pushing data within a time period.

6. The method of claim 2, said sending a third request to the server comprising:
sending the third request to the server in response to not acquiring any data to be pushed within a time period.

7. A method for communication processing, applicable in a server, comprising:
establishing a transmission control protocol (TCP) connection with a client;
receiving a first request sent by the client, wherein the first request is configured to request a configuration document required for microphone-connecting and stream-pushing;
acquiring the configuration document based on the first request, wherein the configuration document is configured to provide a setting item required by the client for microphone-connecting and stream-pushing;
sending the configuration document to the client as a response to the first request; and
turning off the TCP connection with the client,
wherein the first request is an HTTP request, and the configuration document is returned by the server as a response to the HTTP request.

8. The method of claim 7, said acquiring the configuration document based on the first request comprising:
sending a second request to a streaming media data center based on the first request, wherein the second request is configured to request the configuration document from the streaming media data center; and
receiving the configuration document returned by the streaming media data center.

9. The method of claim 8, wherein the configuration document is generated by the streaming media data center based on a system load.

10. The method of claim 7, wherein the configuration document comprises an IP address for the stream-pushing, an audio sample rate, a code format and a code rate.

11. An apparatus for communication processing, applicable in a client, comprising:
a processor; and
a memory configured to store instructions executable by the processor;
wherein the processor is configured to execute the instructions to perform the following operations:
acquiring a first request, wherein the first request is configured to request to turn on a microphone and collect audio;
establishing a transmission control protocol (TCP) connection with a server;
sending a second request to the server, wherein the second request is configured to request a configuration document required for microphone-connecting and stream-pushing, and the configuration document is configured to provide a setting item required for microphone-connecting and stream-pushing;
receiving the configuration document returned from the server;
turning off the TCP connection with the server;
parsing the configuration document;
turning on the microphone based on the setting item; and
collecting the audio and implementing the stream-pushing,
wherein the second request is an HTTP request, and the configuration document is returned by the server as a response to the HTTP request.

12. The apparatus of claim 11, wherein the processor is further configured to perform the following operation:
sending a third request to the server based on a success of the stream-pushing, wherein the third request is configured to inform the server of a success of the microphone-connecting.

13. The apparatus of claim 11, wherein the processor is further configured to perform the following operations:
re-establishing the TCP connection with the server, and sending the third request to the server through the re-established TCP connection.

14. The apparatus of claim 11, wherein the configuration document comprises an IP address for the stream-pushing, an audio sample rate, a code format and a code rate.

15. The apparatus of claim 12, said sending a third request to the server comprising:
sending the third request to the server in response to indication information sent by the server, wherein the indication information is configured to indicate that the server does not receive any stream-pushing data within a time period.

16. The apparatus of claim 12, said sending a third request to the server comprising:
sending the third request to the server in response to not acquiring any data to be pushed within a time period.

* * * * *